United States Patent
Somani et al.

(10) Patent No.: US 12,088,216 B2
(45) Date of Patent: Sep. 10, 2024

(54) DC TO AC CONVERTER WITH MAGNITUDE BASED ON DUTY RATIO

(71) Applicant: Hamilton Sundstrand Corporation, Charlotte, NC (US)

(72) Inventors: Vaibhav Kumar Somani, Karnataka (IN); Kumbha Veera Hanuman, Andhra Pradesh (IN)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 17/989,192

(22) Filed: Nov. 17, 2022

(65) Prior Publication Data

US 2023/0327576 A1    Oct. 12, 2023

(30) Foreign Application Priority Data

Apr. 11, 2022  (IN) .............................. 202211021616
Jul. 12, 2022   (IN) .............................. 202211039969

(51) Int. Cl.
*H02M 1/00*  (2007.01)
*H02M 3/158* (2006.01)
(Continued)

(52) U.S. Cl.
CPC ..... *H02M 7/53803* (2013.01); *H02M 1/0093* (2021.05); *H02M 1/0095* (2021.05);
(Continued)

(58) Field of Classification Search
CPC .. H02M 7/53803; H02M 7/48; H02M 7/4803; H02M 7/4807; H02M 7/4826;
(Continued)

(56) References Cited

U.S. PATENT DOCUMENTS 6,297,974 B1   10/2001  Ganesan et al.
8,829,866 B2 *  9/2014  Lethellier ............... H02M 1/44
                                                    323/286
(Continued)

FOREIGN PATENT DOCUMENTS

WO    2020108759 A1    6/2020

OTHER PUBLICATIONS

Ahmed A. Hossam-Eldin, Ahmed A. Elserougi, Ahmed K. Abdelsalam, Abdelrahman M. Farghly; "Three-phase two-leg buck-boost DC-AC inverter with differential power processor unit"; Aug. 7, 2020; John Wiley & Sons; vol. 48, Issue10; pp. 1583-1613 (Year: 2020).*
(Continued)

*Primary Examiner* — Thienvu V Tran
*Assistant Examiner* — Shahzeb K Ahmad
(74) *Attorney, Agent, or Firm* — CANTOR COLBURN LLP (57) ABSTRACT

A DC to AC converter includes an input configured to receive a DC input voltage, an output and two serially connected capacitors connected across the output. The two serially connected capacitors including a first capacitor and a second capacitor connected together at a connection node. The converter also includes a first parallel converter connected between the input and the connection node and a second parallel converter connected between the input and the connection and in parallel with the first parallel converter. The converter also includes a controller that selectively connects the first and second parallel converters to the input based on a first duty cycle (D1) and second duty cycle (D2), respectively. The controller determines D1 based on comparing a desired alternating current signal across the second first to a measured alternating current signal across the first capacitor such that D1 varies over time.

17 Claims, 9 Drawing Sheets

(51) Int. Cl.
  *H02M 7/48* (2007.01)
  *H02M 7/483* (2007.01)
  *H02M 7/493* (2007.01)
  *H02M 7/538* (2007.01)
  *H02M 7/53846* (2007.01)
  *H02M 7/539* (2006.01)

(52) U.S. Cl.
  CPC ......... *H02M 3/158* (2013.01); *H02M 7/4835* (2021.05); *H02M 7/493* (2013.01); *H02M 7/53846* (2013.01); *H02M 7/539* (2013.01); *H02M 7/48* (2013.01)

(58) Field of Classification Search
  CPC ............... H02M 7/4835; H02M 7/493; H02M 7/53846; H02M 7/539; H02M 1/0003; H02M 1/0009; H02M 1/0025; H02M 1/0029; H02M 1/0067; H02M 1/007; H02M 1/0095; H02M 1/0093; H02M 3/158; H02M 3/3374
  See application file for complete search history.

(56) References Cited

U.S. PATENT DOCUMENTS

| | | | |
|---|---|---|---|
| 8,908,401 | B2 | 12/2014 | Hiltbrunner et al. |
| 9,837,900 | B2* | 12/2017 | Sylla ..................... H02M 3/158 |
| 9,882,464 | B1 | 1/2018 | Li et al. |
| 10,340,814 | B2 | 7/2019 | Shimizu et al. |
| 10,348,190 | B2 | 7/2019 | Shimizu et al. |
| 11,296,602 | B2 | 4/2022 | Somani et al. |
| 2004/0070906 | A1 | 4/2004 | Kohout et al. |
| 2013/0320954 | A1 | 12/2013 | Capofreddi et al. |
| 2015/0214848 | A1 | 7/2015 | Umetani |
| 2018/0294732 | A1* | 10/2018 | Ye ..................... H02M 3/33573 |
| 2021/0126538 | A1 | 4/2021 | Puia et al. |
| 2021/0211059 | A1* | 7/2021 | Jin ..................... H02M 3/33576 |
| 2021/0344279 | A1* | 11/2021 | Sharifzadeh ........ H02M 7/4833 |
| 2021/0391794 | A1 | 12/2021 | Somani et al. |
| 2021/0391797 | A1 | 12/2021 | Somani et al. |
| 2023/0327551 | A1 | 10/2023 | Somani et al. |

OTHER PUBLICATIONS

Wenli Yao; Xiaobin Zhang; Xiongfei Wang; Yi Tang; Poh Chiang Loh; Frede Blaabjerg; "Power decoupling with autonomous reference generation for single-phase differential inverters"; Oct. 29, 2015; IEEE; 2015 17th European Conference on Power Electronics and Applications; pp. 1-10 (Year: 2015).*

Alluhaybi Khalil et al. "Comprehensive Review and Comparison of Single-Phase Grid-Tied Photovoltaic Microinverters", IEEE Journal of Emerging and Selected Topics in Power Electronics, IEEE, Piscataway, NJ, USA, vol. 8, No. 2, Feb. 21, 2019, pp. 1310-1329.

Babu Sambhani Madhu, et al. "Novel Non-Isolated Differential Buck-Boost Inverter with Single-Stage Conversion and Reduced Device Voltage Stress", 2020 IEEE International Conference on Power Electronics, Smart Grid and Renewable Energy (PESGRE2020), IEEE, Jan. 2, 2020, pp. 1-5.

Caceres, et al. "A buck-boost DC-AC converter: operation, analysis, and control", Power Electronics Congress, 1998. CIEP 98. VI IEEE International Morelia, Mexico Oct. 12-15, 1998, Piscataway, NJ, USA, IEEE, US, Oct. 12, 1998, pp. 126-131.

European Search Report for Application No. 23167061.3, mailed Sep. 1, 2023, 9 pages.

European Search Report for Application No. 23167326.0, mailed Sep. 1, 2023, 12 pages.

Hossam-Eldin et al. "Three-phase two-leg buck-boost DC-AC inverter with differential power processor unit", International Journal of Circuit Theory and Applications, John Wiley &Sons, Inc. Hoboken, USA, vol. 48, No. 10, Aug. 7, 2020, pp. 1583-1613.

Xu Shuang et al. "Single-Phase Differential Buck-Boost Inverter with Pulse Energy Modulation and Power Decoupling Control", IEEE Journal of Emerging and Selected Topics in Power Electronics, IEEE, Piscataway, NJ, USA, vol. 6, No. 4, Dec. 1, 2019, pp. 2060-2072.

Yao Wenli et al. "Power decoupling with autonomous reference generation for single-phase differential inverters", 2015 17th European Conference on Power Electronics and Applications, Jointly Owned By EPE Association and IEEE PELS, Sep. 8, 2015, pp. 1-10.

* cited by examiner

DC TO AC CONVERTER WITH MAGNITUDE BASED ON DUTY RATIO

CROSS-REFERENCE TO RELATED APPLICATIONS

This application claims priority to Indian Patent Application No. 202211021616 filed Apr. 11, 2022 and Indian Patent Application 202211039969 filed Jul. 12, 2022, the entire contents of which are incorporated herein by reference.

BACKGROUND

The present disclosure relates generally to power converters and, in particular, to DC to AC converters.

Switched mode DC to DC converter power supplies are widely used to convert power from a source, such as mains power, to DC power supply for electronic devices.

Modern embedded control systems require power rails voltage as low as 1V. In aerospace or in any domain a typical standard voltage available is 28V (or 48V). So for point of load (PoL) an efficient DC-DC converter is needed to step-down the 28V (or 48V) to 1V. Also, another requirement may be that the DC to DC converter to provide both positive and negative voltage outputs (bipolar topology).

To achieve the large step-down gain and bipolar topology, the conventional/basic dc-dc converters have to operate at an extreme duty cycle (less than 0.1) and this results to a required control circuit that is fast and, thus, expensive. Further, such devices may be limited to DC to DC conversion only and, in some cases, such a limitation may not be desirable. Further, such devices can also be used for DC to DC conversion.

SUMMARY

According to one embodiment a DC to AC converter is disclosed. The converter includes an input configured to receive a DC input voltage, an output, and two serially connected capacitors connected across the output, the two serially connected capacitors including a first capacitor and a second capacitor connected together at a connection node. The converter also includes a first parallel converter connected between the input and the connection node and a second parallel converter connected between the input and the connection and in parallel with the first parallel converter. The converter also includes a controller that selectively connects the first and second parallel converters to the input based on a first duty cycle (D1) and second duty cycle (D2), respectively. The controller determines D1 based on comparing a desired alternating current signal across the second first to a measured alternating current signal across the first capacitor such that D1 varies over time.

In addition to or an alternative to any prior embodiment, the first parallel converter can be connected to the input for a first duty cycle (D1) that is a portion of a preselected time period (T) and the second parallel converter can be connected to the input for a second duty cycle (D2) that is a portion of the preselected time period (T).

In addition to or an alternative to any prior embodiment, the voltage at the output is positive when D2 is greater than D1 and negative when D2 is less than D1.

In addition to or an alternative to any prior embodiment, the first parallel converter includes a first switch and first inductor connected in series between the input and the connection node.

In addition to or an alternative to any prior embodiment, the second parallel converter includes a third switch and second inductor connected in series between the input and the connection node.

In addition to or an alternative to any prior embodiment, a second switch connected between an output of the first switch and first output terminal of the output; and a fourth switch connected between an output of the third switch and a second output terminal of the output.

In addition to or an alternative to any prior embodiment, when D2 is greater than D1, the controller causes the converter to operate in three states; wherein in a first state of the three states, the first and third switches are conductive and the second and fourth switches are open; wherein in a second state of the three states, the first and fourth switches are open and the second and third switches are conductive; and wherein in a third state of the three states, the first and third switches are open and the second and fourth switches are conductive.

In addition to or an alternative to any prior embodiment, when D1 is greater than D2, the controller causes the converter to operate in three states; wherein in a first state of the three states, the first and third switches are conductive and the second and fourth switches are open; wherein in a second state of the three states, the first and fourth switches are conductive and the second and third switches are open; and wherein in a third state of the three states, the first and third switches are open and the second and fourth switches are conductive.

Also disclosed is a method of operating a converter of any prior embodiment. The method includes: determining a desired alternating current output at the output; selecting a base value of D1 that based on a desired offset of the desired alternating current output; and selecting a value of D2 that shifts the offset to a desired level.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings, in which:

DETAILED DESCRIPTION

For the purposes of promoting an understanding of the principles of the present disclosure, reference will now be made to the embodiments illustrated in the drawings, and specific language will be used to describe the same. It should nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and/or a direct "connection" unless specified to the contrary in the claims below.

In general, embodiments herein relate to an application of a dc-dc converter technique that can provide both positive and negative polarity outputs.

The described embodiments are explained with respect to an example of step-down (buck) DC-DC converters. In one embodiment, a circuit architecture is provided that may achieve better duty cycle performance with vector sum output technique. The proposed topology consists of 4 switches, 2 inductors, and 2 output capacitors). The switches are arranged to allow for the circuit to arrange such that it can provide a combination of two parallel converters that, receptively, operate on duty cycles D1 & D2.

Further, in one embodiment, based on the ratio of D1 and D2, the output terminal can be configured for both positive and negative output voltages. For positive output voltage (VOUT) the duty cycles should be D2>D1. For negative output voltage (VOUT) the duty cycles should be D1>D2.

Also disclosed after an explanation of the DC operation is how the same circuit can be used to provide an AC output by varying D2. While D2 is used as an example, D1 could also be varied. Further, while certain functional blocks are shown and described in relation to the figures herein, the functions could be implemented in software, hardware, or a combination of both.

Figure 1:
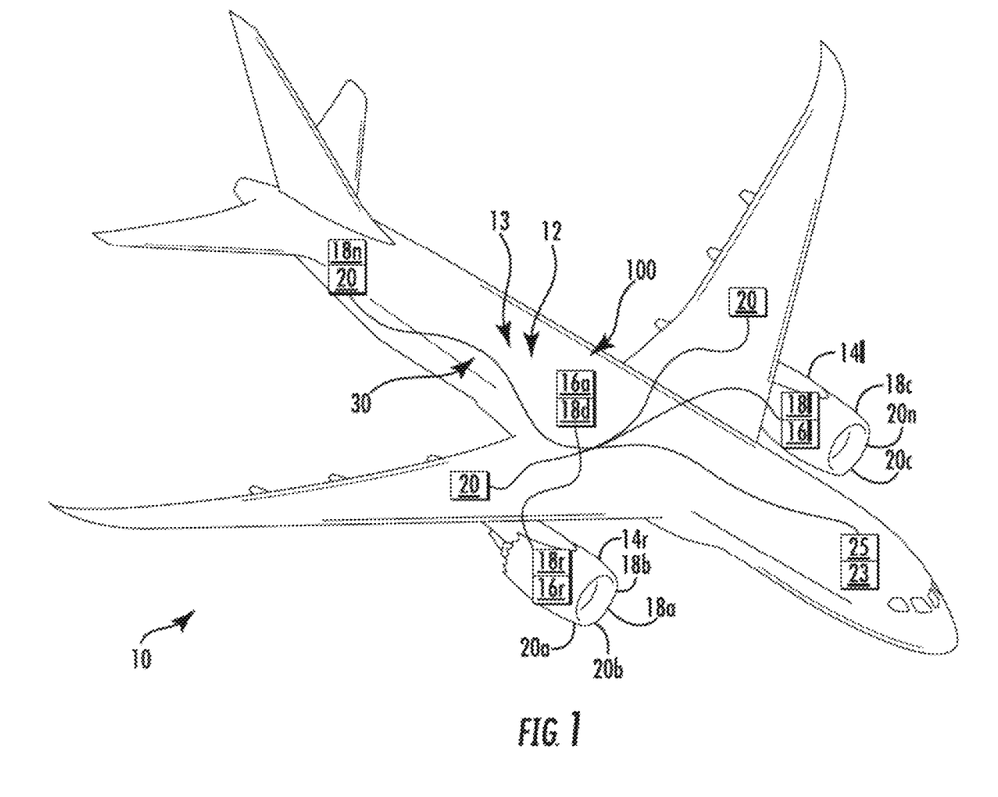
FIG. 1 depicts an example of an aircraft with controller and electrical power systems in accordance with an exemplary embodiment.

Referring to FIG. 1, an aircraft 10 is shown. Aircraft 10 includes one or more control systems shown generally as 12.

The control system 12 may include a power system 13 that interconnects with one or more controllers referred to generally as 16 and more specifically 16*l*, 16*r* commonly located at or near each engine 14*l*, 14*r*. Other controllers 16 are also be depicted in this instance as 16*a*, 16*b*, and the like. In the described embodiments, the reference numerals are annotated with an "l" or "r" to denote the left or right side of the aircraft 10, respectively, for the purpose of simplicity of description. Likewise, the annotation "a", "b", "n" is employed to simplify designation of a multiple enumeration of a component or element.

Each of the controllers 16 may be configured to receive various sensor signals from sensors referred to generally as 18 and individually as 18*a*, 18*b*, . . . 18*n* all over the aircraft 10 and may also operate one or more actuators shown generally as 20, and more specifically as 20*a*, 20*b*, 20*c*, . . . 20*n* to control the operation of the engines 14*r*, 14*l*, flight controls, (not shown), power systems 13 and the like. The control system 12 and power system 13 may also be operably connected to various other components throughout the aircraft 10, including, but not limited to other controllers 16, control panels 23, displays 25, and the like. Some controllers 16 e.g., 16*a* may also be configured to receive power from various aircraft sources, e.g., generators, batteries and the like and distribute power as needed to various systems in the aircraft 10.

The power system 13 may be part of a controller 16. In yet another embodiment, the configuration could be the opposite with the controller 16 operating as or providing a portion of the power system 13, as illustrated by the general depiction of 16*a* and described further herein.

In an embodiment, the power system 13 incudes a power supply or converter 100 hereinafter referred to as a power supply 100 as described herein for receiving power from a bus system, converting and routing power to various components in the aircraft 10. In one embodiment, and as described by way of example herein, the power supply 100 is a DC to DC converter. It shall be understood that the power supply 100 includes an input that can be connected to, for example, a DC bus that provide a relatively high level voltage (e.g., 28/48V) and steps that voltage down to a much lower voltage (e.g., 1V).

Figure 2:
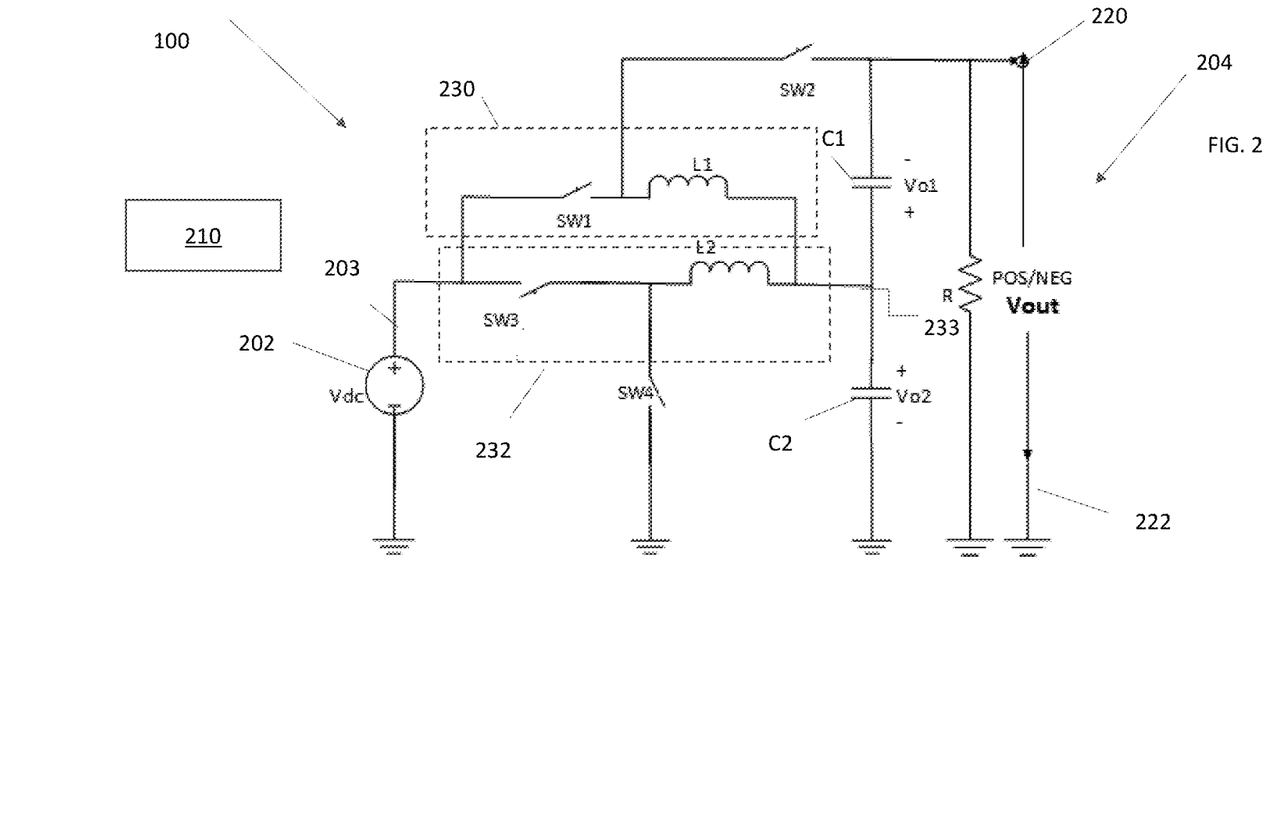
FIG. 2 depicts a simplified schematic diagram of an embodiment of a DC to AC power converter according to one embodiment. The figure will be used to describe a general operation of the circuit when generating a DC output for greater understanding of circuit operation.

With reference now to FIG. 2, an example of a DC to DC converter/power supply 100 is illustrate. Herein, the DC to DC converter/power supply 100 may be referred to as a converter 100 for brevity. The particular arrangement of circuit elements switches (SW1-SW4) and the current shaping elements (R, C1/C2 and L1/L2) are illustrative and modifications could be made. For example, R could be formed by a combination of resistors connected in series or parallel. Similarly, C1/C2 and could be formed by a combination of capacitors/inductors as will be understood by the skilled artisan. In addition, a capacitor could be coupled across the output (in parallel with R) to smooth the output.

The converter 100 include an DC input 203. The input 203 can be connected to a DC voltage source 202 labelled as Vdc herein. The source could be any source and, in one embodiment, is a DC bus of an aircraft. Vdc can be in the range of 28-48V in one embodiment.

The converter 100 also includes an output 204. The output 204 is labelled as Vout in FIG. 2 and is shown as being provided across an output resistor R. The output voltage Vout can be in the range of 1-4V in one embodiment. The magnitude of the output voltage Vout can be based on a ratio of operating times (duty cycle) in the parallel converters 230, 232 of the converter 100. The duty cycle of the first and second modes shall be referred as D1 and D2, respectively herein.

In the below it shall be assumed that for a certain time period T, the portion of that time period T is which power is provided from the input 202 to either the first or second converters 230, 232 (e.g., through L1/L2) defines the duty cycle. It shall be understood that T is defined as the time it takes to transfer through all three of the states discussed below.

As will be understood more fully from the below, Vout can have a positive or negative value based on with the relative duty cycles of the two different operating modes of the converter 100. That is, when D1 is greater than D2, Vout is negative and when D1 is less than D2, Vout is positive. This is due to relative stored energy in the first and second inductors L1/L2 that are allowed to dissipate in C1/C2 as described below.

For completeness certain connections between the elements between the elements of the converter 100 will now be detailed. The operation of the converter 100 will then be explained with reference to FIGS. 3 to 6 which show the different states/configurations of the converter 100.

C1 and C2 are serially connected across the output Vout. In particular, C1 and C2 are serially connected are connected between output terminals 220, 222. As shown, output terminal 222 is connected to ground. The output resistor R is connected in parallel with the serially connected capacitors C1, C2. Thus, C1/C2 and R are shown as being connected between output terminal 220 and ground 222. C1 and C2 are connected to one another at a connection node 233. C1 is connected between output terminal 220 and the connection node 233 and C2 is connected between the connection node 233 and output terminal 222 (e.g., ground).

The states are selected based on the open/closed position of switches SW1-SW4. Herein, a switch is closed is if passes current and open if it does not. The switches SW1-SW4 can be any type of switch. In one embodiment, the switches SW1-SW4 are transistors. The switches SW1-SW4 can be controlled by a controller 210. While the connections between the controller 210 and switches SW1-SW4 are not shown, the skilled artisan will understand that the controller 210 can transmit a signal to the switches SW1-SW4 that causes them to open or close. In particular, the controller will cause the converter 100 to begin in a first state where both L1 and L2 are connected to input and then transfer into one of two different second states depending on the desired output polarity. In one of the two second states, the L1 is connected to input 203 and L2 is not and the opposite is true in the other second state. Regardless, the converter then moves into a third state where neither L1 nor L2 is connected to the input. In a specific example the converter 100 will be in the third state about 50% of the time.

As shown in FIG. 2, both switches SW1 and SW3 are electrically coupled to the input 202. As shown the switches SW1 and SW3 include a switch input that is coupled to the input 202. Both switches SW1 and SW3 also include a switch output. For context, when closed, current flows from the switch input to the switches SW1 and SW3 to their respectively output sides. The output sides of the switches SW1 and SW3 are respectively coupled the first and second inductors L1, L2. A first end of the first inductor L1 is connected to the switch output of the first switch SW1. A first end of the second inductor L2 is connected to the switch output of the third switch SW3. The second ends of the first and second inductors L1, L2 are connected together and connected to the connection node 233. The second ends of the first and second inductors L1, L2 are both connected to ground through second capacitor C2.

The second switch SW2 is connected between the switch output of the first switch SW1 and the output 220. In particular, the input of the second switch SW2 is connected to the switch output of the first switch SW1 and the output of the second switch SW2 is connected to the output 220. As such, the output of the second switch SW2 is also connected to the first capacitor C1. The fourth switch SW4 is connected to the switch output of the third switch SW3.

Figure 3:
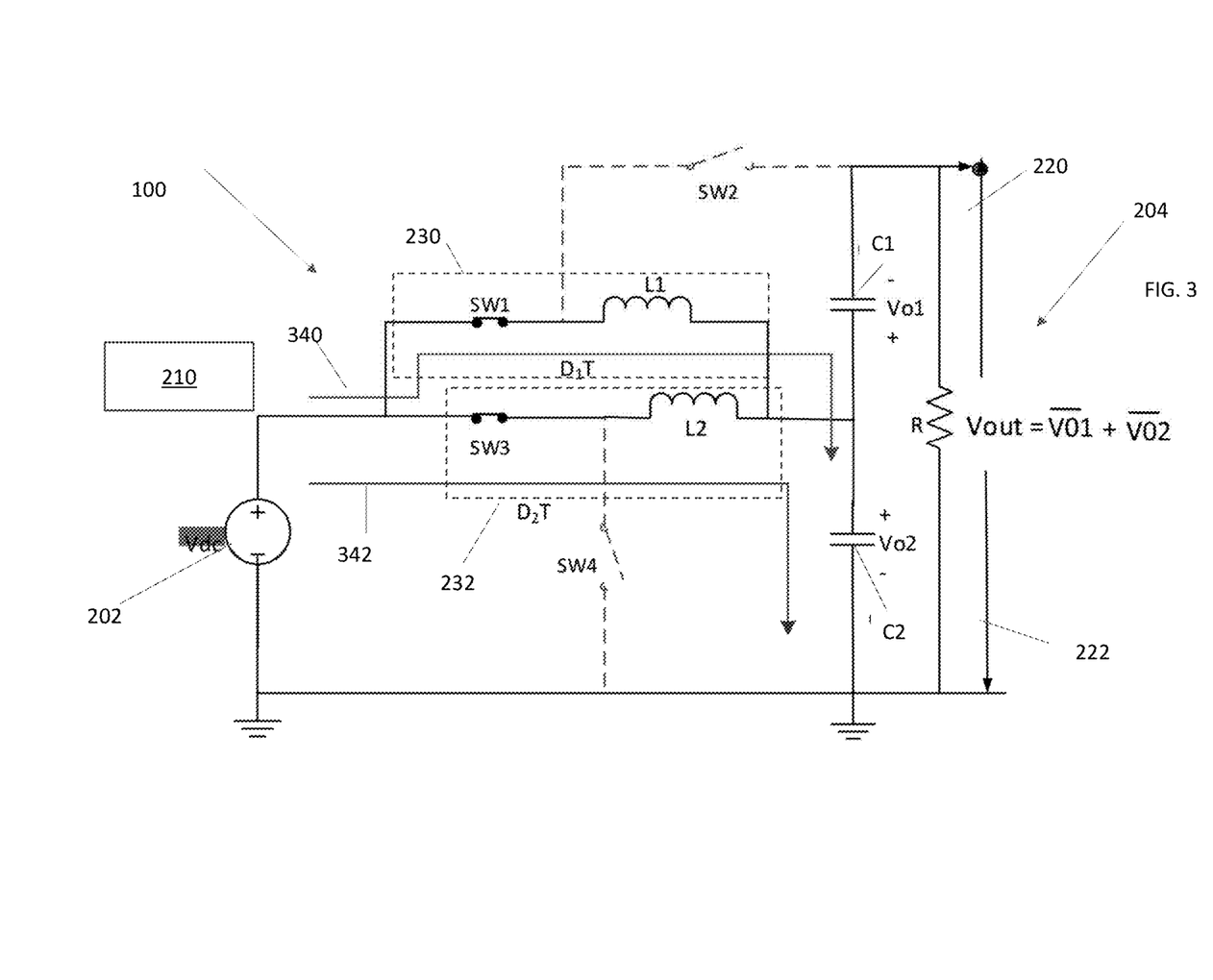
FIG. 3 depicts the power converter of FIG. 2, in a first state.

With reference now to FIG. 3, the circuit 100 is shown in a first state where SW1 and SW3 are closed and SW2 and SW4 are open. This allows for both inductors L1 & L2 to be connected in parallel and stores energy for a periods $D_1*T$ and $D_2T$, respectively, through an output capacitor C2 as shown FIG. 3. The current paths are shown in such states as paths 340, 342 in FIG. 3. An explanation of how D1 and D2 can be selected is provided below. It shall be understood that during $D_1*T$ period the voltage across the inductor L1 equals:

$$V_{L1}=V_{dc}-V_{o2} \qquad (1)$$

and during $D_2*T$ period the voltage across the inductor L2 equal:

$$i\ V_{L2}=V_{dc}-V_{o2} \qquad (2)$$

Figure 4:
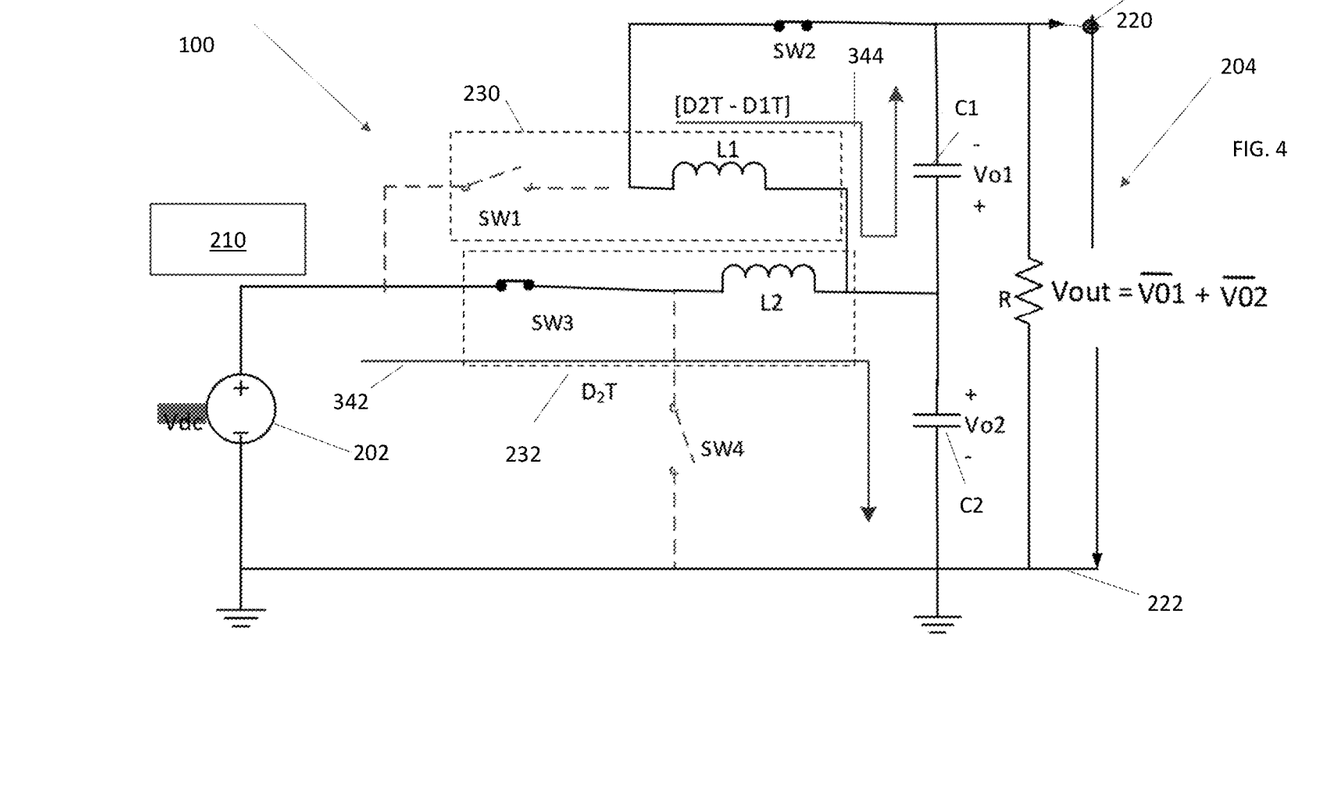
FIG. 4 depicts the power converter of FIG. 2, in an example second state where a positive output is desired (D2>D1)
Figure 5:
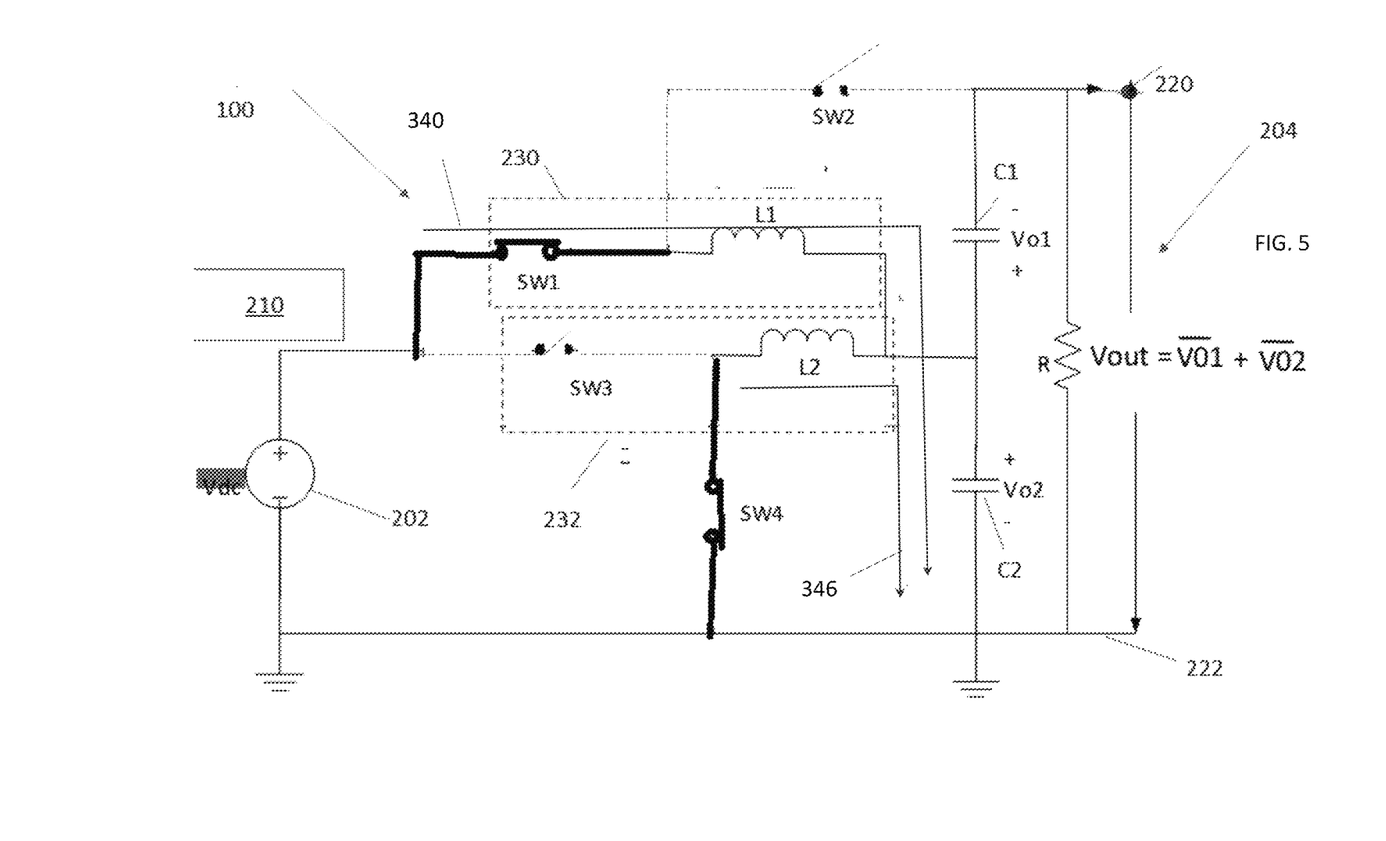
FIG. 5 depicts the power converter of FIG. 2, in an alternative example second state where a negative output is desired (D1>D2)

In all cases herein, both SW1 and SW3 are closed in this first state. To vary D1 and D2 to set Vout either positive or negative, one switch is allowed to remain closed in the second state and the other opened. The two different variations of the second state are shown in FIGS. 4 and 5. In short, in the second state for a negative voltage, D1 is greater than D2 and thus, SW1 is closed and SW3 is open and for a positive voltage D2 is greater than D1 and SW1 is open and SW3 is closed.

For example, consider FIG. 4 which shows the configuration for D2 greater than D1, SW1 is opened and SW3 remains closed. During this second state, SW2 is closed which allows L1 to be connected in parallel with and releases its energy into C1 (path 344).

Alternatively, as shown in FIG. 5, the if D1 is greater than D2 (negative voltage desired at output 204) SW3 can be opened and SW4 closed allowing L2 to discharge C2 (path 346). This will provide for a longer time to store energy in L1 as compared to L2.

Regardless of desired output level/polarity, in the third state both L1 and L2 are disconnected from the input 202 and allowed to discharge through their respective capacitors. As Vout is the sum of Vo1 and Vo2, which ever inductor L1/L2 was connected longer will dominate the output and determine the polarity. The difference in time will establish the magnitude but for small output voltages (assuming relatively similar component values) the difference between D1 and D2 should be relatively small.

Figure 6:
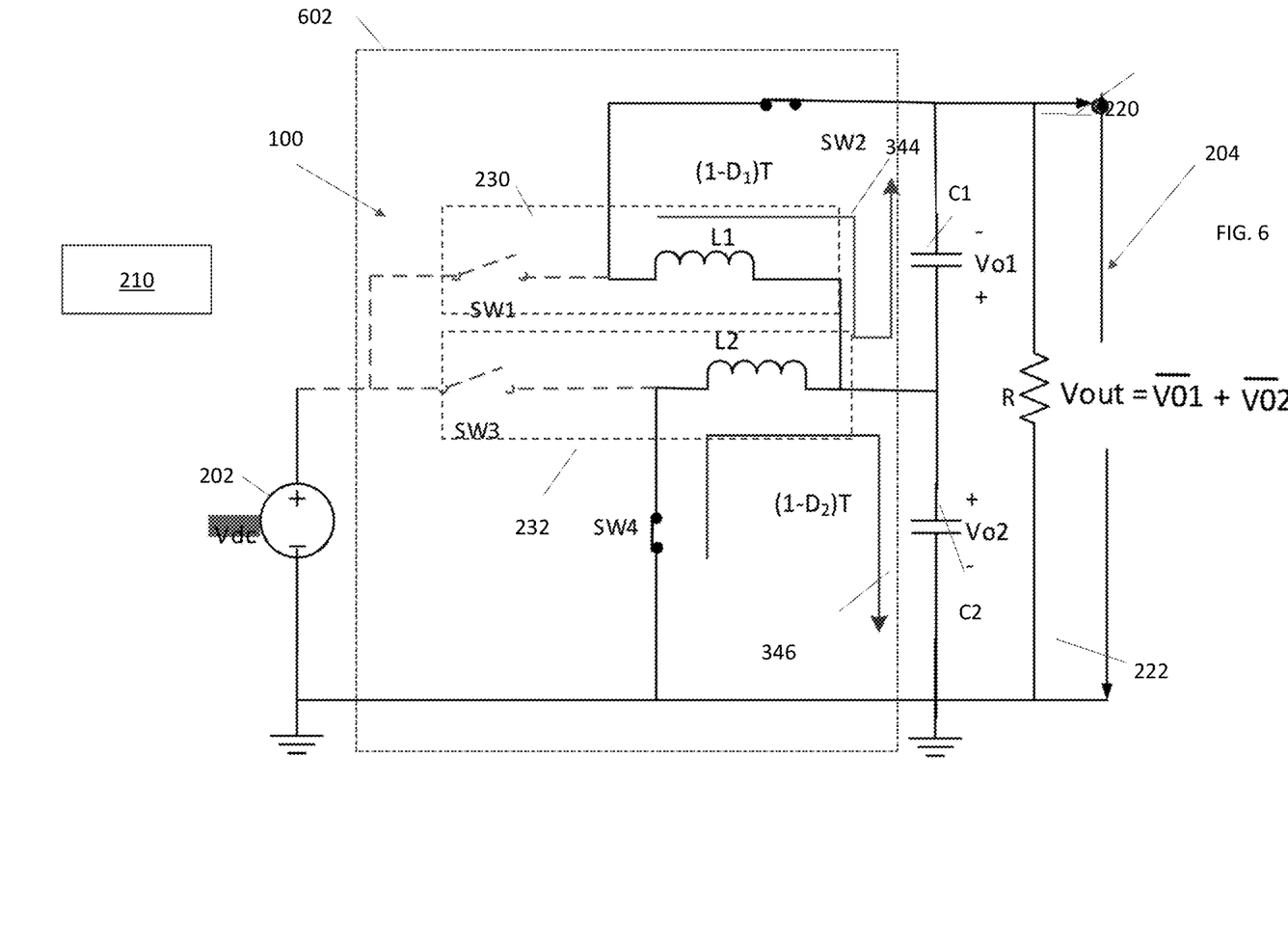
FIG. 6 depicts the power converter of FIG. 2 in a third state where neither portion of the converter is connected an input (Vdc)

Regardless of whether D1 or D2 is greater, in a third state (FIG. 6) switch SW1 and SW3 are opened (turn OFF) and, SW2 and SW4 are closed (turned on). In this state, inductor L2 connected in parallel with capacitor C2 and release its energy through it and produces a positive voltage Vo2 across C2. In upper converter section 230 the switch SW2 is closed state and the inductor L1 release its energy through capacitor C1 and generates a negative voltage Vo1 across Co1. During $(1-D_1)*T$ period the voltage across the inductor L1 is:

$$V_{L1}=V_{o1} \qquad (3); \text{and}$$

during $(1-D_2)*T$ period the voltage across the inductor L2 is:

$$V_{L2}=-V_{o2} \qquad (4)$$

As discussed above, the output voltage (Vout) is vector sum of Vo1 and Vo2 as shown in FIGS. 3-6. If the magnitude of voltage Vo1<Vo2 and corresponding duty cycles are $D_1 < D_2$ then the resultant of Vout will be positive and similarly if Vo1>Vo2 and corresponding duty cycles are $D_1 > D_2$ then the resultant Vout will be negative.

The state of the switches can be summarized in Tables 1 and 2 below. In these tables "off" refers to an open or non-conductive switch and "on" refers to a closed or conductive switch. Table 1 is used when a positive output is desired and Table 2 is used when a negative output is desired. The switching can be handled by logic in the controller 210.

TABLE 1

(D1 < D2; Positive output voltage)

| | Switch | | | |
|---|---|---|---|---|
| State | SW1 | SW2 | SW3 | SW4 |
| STATE 1 | ON | OFF | ON | OFF |
| STATE 2 | OFF | ON | ON | OFF |
| STATE 3 | OFF | ON | OFF | ON |

TABLE 2

(D2 < D1; negative output voltage)

| | Switch | | | |
|---|---|---|---|---|
| State | SW1 | SW2 | SW3 | SW4 |
| STATE 1 | ON | OFF | ON | OFF |
| STATE 2 | ON | OFF | OFF | ON |
| STATE 3 | OFF | ON | OFF | ON |

The above description gives the configurations that can be utilized to generate desired outputs. The following description provides further explanation of various parameters during operation.

The combination of SW3, SW4, L2 and C2 is similar to buck converter. Applying the volt-sec balance equation for inductor L2 using eq. (2) & (4) yields:

$$(V_{dc} - V_{o2})D_2 T - V_{o2}(1 - D_2)T = 0$$

$$V_{o2} = D_2 * V_{dc} \quad (5)$$

Similarly applying the volt-sec balance equation for inductor L1 using eq. (1) & (3) yields:

$$(V_{dc} - V_{o2})D_1 T + V_{o1}(-D_1)T = 0 \quad (6)$$

Solving equations (5) & (6) yields:

$$V_{o1} = -\frac{(1 - D_2)}{(1 - D_1)} * D_1 * V_{dc} \quad (7)$$

As discussed above, the output voltage (Vout) is vector sum of Vo1 and Vo2 as shown FIG. 2-6.

$$V_{out} = \overline{V0}1 + \overline{V0}2 \quad (8)$$

Substituting Vout into equations (5) & (6) yields:

$$V_{out} = -\frac{(1 - D_2)}{(1 - D_1)} * D_1 * V_{dc} + D_2 * V_{dc} \quad (9)$$

Simplifying results in $$V_{OUT} = \frac{D2 - D1}{1 - D1} * V_{dc} \quad (10)$$

Given the above discussion, now presented is a method to determine when to switch from various states to get the desired voltage output and polarity.

Figure 7:
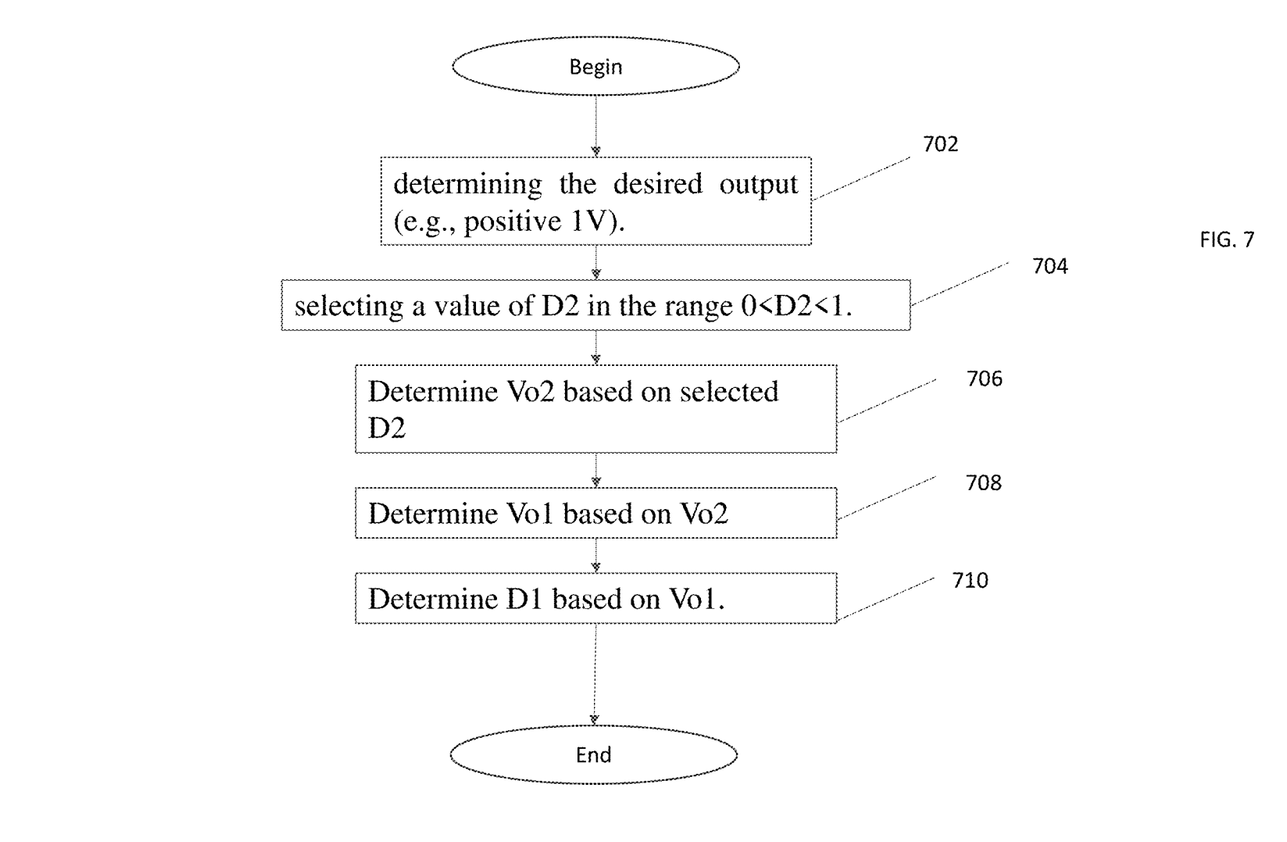
FIG. 7 shows an example method of selecting D1 and D2 according to one embodiment.

An example of such method is shown in FIG. 7. At block 702 the method includes determining the desired output. For this example, assume a positive 1 V output is desired based on a 48V Vdc. It is known based on the disclosure herein that D2 will be greater than D1.

As indicated at block 704, as the this can include selecting a value of D2 in the range 0<D2<1. To ensure Vout is positive, D2 can be selected to be at least 0.5 but could be larger. For simplicity, assume D2 equals 0.5. With this assumption, Vo2 is 24V per equation (5) above and as indicated by block 706.

As indicated at block 708, after Vo2 is known, Vo1 can be calculated from equation (8) and will equal −23V in this case. After Vo1 is known, D1 can be calculated at block 710 from equation (7) above and will equal 0.489 (e.g., 0.49) in this example.

This can be translated in operation commands as follows: for a given time period T, the converter will be configured in the state 1 (either table) for 49% of the time and then switch to the configuration of state 2 in Table 1 for the 1% of the time before switching to state 3 for the remainder of T. This means that for most of the time both parallel converters 230, 232 are connected to the input and the variation in magnitude and polarity of the output is based on the amount of time when in the second state. Stated differently, most of the time portion of connection of the parallel converters 230, 232 runs simultaneously. Thus, the method can also include having the controller selectively open and close SW1, SW2, SW3, SW4 based on D1 and D2 and the polarity (with polarity determining which of tables 1 or table 2 to select).

In a positive polarity case this will mean that the controller causes the converter to be in the first state for a time period equal to D1*T and causes the converter to be in the first state and second states for a combined time period equal to D2*T.

Similarly, in a negative polarity case this will mean that the controller causes the converter to be in the first state for a time period equal to D2*T and causes the converter to be in the first state and second states for a combined time period equal to D1*T.

The skilled artisan will realize that after being determined, the controller 210 can then cause the above operations to happen by opening and closing the switches based on the tables above.

Above, the output is a vector sum of a positive and negative voltage. A desired output with either polarity can be generated by controlling the voltage across two output capacitors. This allows for the generation of an output voltage at comparatively higher duty cycle of control signal. For example, 48V to 1V conversion requires 2.08% duty cycle in case of a prior art buck converter, but in proposed solution it is close to ~50% duty cycle. Further, the circuit herein can be operated at a flexible/desired duty cycle for any level of conversion and by choosing either table 1 or table 2, a positive or negative output can be achieved.

In the above description it was assumed that the duty cycle remained constant over time. It shall be understood, however, that if one D1 or D2 is variable, then the relative values D1 to D2 will change over time. Herein, it shall be assumed in the following discussion D2 is variable. To that end, Vo1 will be DC in nature and Vo2 should be of DC+AC in nature to create an AC output.

In FIG. 6 a box 602 is provided that encapsulates the circuit driving Vo1 and Vo2 to produce either the desired positive or negative output. That circuit was controlled by controller 210 which provided inputs (e.g. switching signals for the switches SW1-SW4 based on D1/D2. This can be done, as is known in the art, by utilizing a pulse width modulator (PWM) that provides a two-level output (e.g., 1/0) based on the desired duty cycle.

Figure 8:
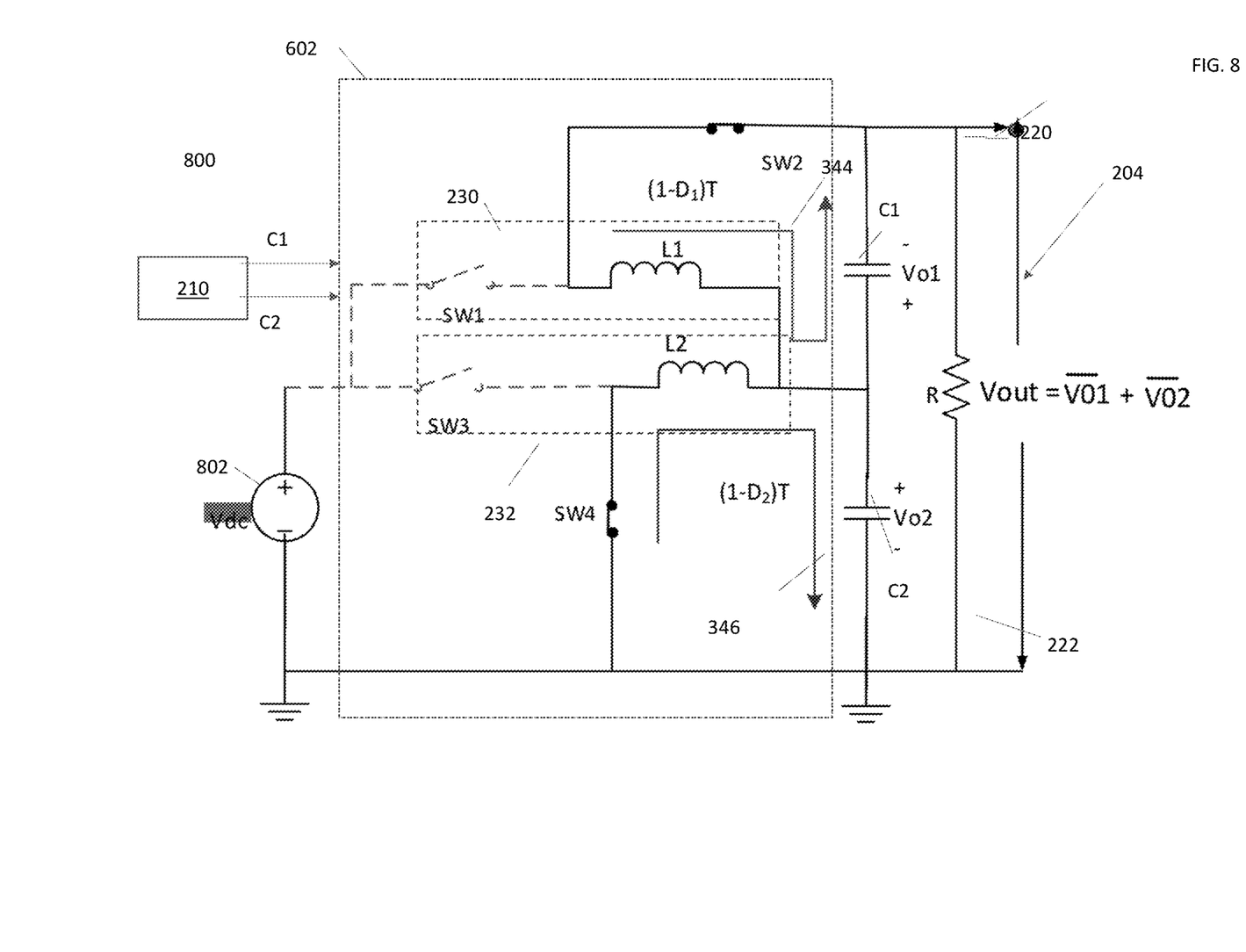
FIG. 8 shows a version of the circuit in FIG. 2 that allows for the creation of an AC output.

FIG. 8 show a block diagram of a system 800 that includes the driving circuit 602 from FIG. 6. However, the system 800 can be operated such that it can produce an AC output. This system can produce an AC output. In the above discussion it was assumed that a selection of DC output polarity could be changed based on choosing table 1 or table 2. However, if the system is configured so that one of Vo1/Vo2 is variable, the associated duty cycle can also change. To have that happen the system (e.g., controller 210) will switch between tables depending the relative desired values D1/D2 in as above. In the below working example, Vo1 will sinusoidally varying output that oscillates around a negative value that is added to a positive DC Vo2 to remove the offset (e.g., the negatively value around which Vo1 oscillates).

From above it is noted that:

$$V_{OUT} = \frac{D2 - D1}{1 - D1} * V_{dc} \qquad (10)$$

If D1 changes sinusoidally, Vout will change accordingly. In this example, the system 800 includes a DC voltage source 802. The DC voltage source 802 is connected to the circuit 602. The system 800 also includes the controller 210 from above. This controller 210 provides control signals C1 and C2 to circuit 602. C1 and C2 control the opening and closing of the switches based on the selected tables above and are based on the calculated duty cycles for the desired outputs Vo1 and Vo2.

In this working example, assume that the DC voltage source 802 provides a DC voltage of greater than 460V (e.g., 500 v) and a peak-to-peak AC voltage of 460V is desired. IN this example it is assumed that Vo1 will oscillate around a negative DC bias. In this case, for 460 V p-p, the value will be −230 V. Vo2 can be used to offset this negative DC bias. Given that from above:

$$V_{o2} = D_2 * V_{dc} \qquad (5);$$

D2 can be set to 0.46 to achieve a positive 230V DC at Vo2.

It shall be assumed that rate that at which D1 will be varied (e.g., the period of the output 820 at Vo2 shown in FIG. 8) is longer than the each PWM controlled switching cycle. In one example, the period of the output is 2 times X longer. For example, switching frequency of the converter 230 can be 100 kHz, where duty cycle can be varied/updated at the rate of 10 times of required frequency of AC output. For 50 Hz AC output D1 can be varied/updated at the rate of 500 Hz. This will result in AC output with 10 levels or steps. If update rate is 5 kHz then output will have 100 levels. If finer sinusoidal output is required then update rate should be higher but not more than half of switching frequency (or 2× longer duration then switching period).

To set Vo1 to a sinusoid that varies around −230V, 11 can be calculated from equation (7) above:

$$V_{01} = -\frac{(1-D_2)}{(1-D_1)} * D_1 * V_{dc}; \qquad (7)$$

As discussed above, D2 is fixed to 0.46. As will be understood from equation 7, if D1 varies, D1 then Vo1 will vary.

D1 can be calculated by re-arranging equation 7 as:

$$D1 = \frac{1}{1 - (1 - D2) * Vdc/Vo1}$$

Hence, for Vdc=500, D2=0.46, when for Vo1=0, D1=0, for Vo1=−230, D1=0.46 and for Vo1=−460V, D1=0.63. Stated differently, D1 will vary from 0 to 0.63 in this example. Of course, different values of D1 and D2 could be calculated based on available Vdc and the desired p-p output.

Figure 9:
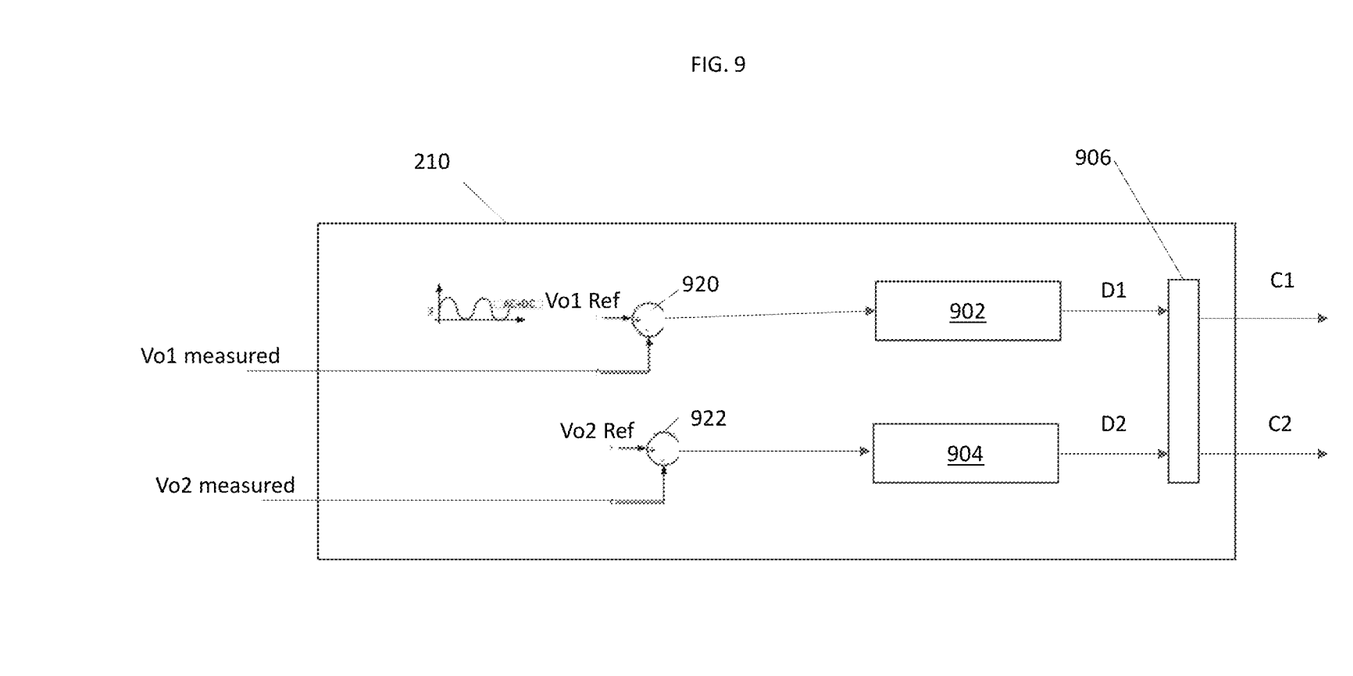
FIG. 9 shows details of the controller that allow for the circuit of FIG. 8 to provide an AC output.

As shown in FIG. 9, The controller 210 can include one or more PWW devices. These devices can be programmed to slightly vary duty cycle D1/D2 to produce the desired output by providing them a base duty cycle and feedback to alter that cycle based on a comparison to a reference voltage. As shown, a first PWM 902 provides the duty cycle commands that defines D1 (and thus C1) based on a difference between a measured value of Vo1 to the desired constant output voltage (Vo1 Ref). In this example, assume that the "base" D1 is sinusoidal and the "base" D1 is 0.46 and the desired output is sinusoidal and varies between 0 and −460V (e.g., varies around −230V). The reference (Vo1 Ref) is added to an inverted measured Vo1. If the measured value is too "high" the output of summation element 920 will be a negative number and, thus, D1 will be reduced by the first PWM 902. If the measured value is too "low" the output of summation element 920 will be a positive number and, thus, D1 will be increased by the first PWM 902.

As shown, a second PWM 904 provides the duty cycle commands that defines D2 (and thus C2) based on a difference between a measured value of Vo2 to the desired output voltage (Vo2 Ref). In this example, assume that the "base" D2 is 0.46 and the desired output 230V DC. The reference (Vo2 Ref). is added to an inverted measured Vo2 a summation element 922. If the measured value is too "high" the output of summation element 922 will be a negative number and, thus, D2 will be reduced by a proportional amount by the second PWM 904. If the measured value is too "low" the output of summation element 922 will be a positive number and, thus, D2 will be increased by the second PWM 904.

The controller 210 also includes a scheduler. The scheduler 210 creates the switching patterns for switches SW1-SW4 based on the table above. The table to be selected will be based on a comparison of D1 and D2 but, in this case, the table can switch during operation as the skilled artisan will realize based on the teachings herein.

In current systems, for DC-AC conversion, SPWM (Sinusoidal PWM) control technique is popular for generating averaged sinusoidal output voltage. But the generated output voltage is pulsating averaged sinusoidal waveform in nature so there can be an hormonic content in output voltage.

Embodiments herein may avoid that as there are is no pulsation, only a sinusoidal output (Vo1) that this shifted up by an offset (Vo2).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, element components, and/or groups thereof. For the purposes of this disclosure, it is further understood that the terms "inboard" and "outboard" can be used interchangeably, unless context dictates otherwise.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

What is claimed is:

1. A DC to AC converter, the converter comprising:
   an input configured to receive a DC input voltage;
   an output;
   two serially connected capacitors connected across the output, the two serially connected capacitors including a first capacitor and a second capacitor connected together at a connection node, wherein the second capacitor is connected between the connection node and ground;
   a first parallel converter connected between the input and the connection node;
   a second parallel converter connected between the input and the connection node and in parallel with the first parallel converter; and
   a controller that selectively connects the first and second parallel converters to the input based on a first duty cycle (D1) and second duty cycle (D2), respectively, and wherein D2 is a fixed value and D1 is variable value, wherein D1 varies based on a desired alternating current signal across the output.

2. The converter of claim 1, wherein the first parallel converter is connected to the input for the a first duty cycle (D1) that is a portion of a preselected time period (T) and the second parallel converter is connected to the input for a second duty cycle (D2) that is a portion of the preselected time period (T).

3. The converter of claim 2, wherein the voltage at the output is positive when D2 is greater than D1 and negative when D2 is less than D1.

4. The converter of claim 1, wherein the first parallel converter includes a first switch and first inductor connected in series between the input and the connection node.

5. The converter of claim 4, wherein the second parallel converter includes a third switch and second inductor connected in series between the input and the connection node.

6. The converter of claim 5, further comprising:
   a second switch connected between an output of the first switch and first output terminal of the output; and
   a fourth switch connected between an output of the third switch and a second output terminal of the output.

7. The converter of claim 6, wherein when D2 is greater than D1, the controller causes the converter to operate in three states;
   wherein in a first state of the three states, the first and third switches are conductive and the second and fourth switches are open;
   wherein in a second state of the three states, the first and fourth switches are open and the second and third switches are conductive; and
   wherein in a third state of the three states, the first and third switches are open and the second and fourth switches are conductive.

8. The converter of claim 6, wherein when D1 is greater than D2, the controller causes the converter to operate in three states;
   wherein in a first state of the three states, the first and third switches are conductive and the second and fourth switches are open;
   wherein in a second state of the three states, the first and fourth switches are conductive and the second and third switches are open; and
   wherein in a third state of the three states, the first and third switches are open and the second and fourth switches are conductive.

9. A method of operating a converter as recited in claim 6, the method comprising:
   determining a desired alternating current output at the output;
   selecting a base value of D1 that based on a desired bias value around which a voltage of across the first capacitor is to vary around, wherein the bias value is a negative value equal to half a peak to peak voltage offset of the desired alternating current output; and
   selecting a value of D2 that shifts the bias value offset to a desired level.

10. The method of claim 9, wherein when D2 is greater than D1, the controller causes the converter to operate in three states;
    wherein in a first state of the three states, the first and third switches are conductive and the second and fourth switches are open;
    wherein in a second state of the three states, the first and fourth switches are open and the second and third switches are conductive; and
    wherein in a third state of the three states, the first and third switches are open and the second and fourth switches are conductive.

11. The method of claim 9, wherein the controller causes the converter to be in the first state for a time period equal to D1*T.

12. The method of claim 11, wherein the controller causes the converter to be in the first state and second states for a combined time period equal to D2*T.

13. The method of claim 9, wherein when D1 is greater than D2, the controller causes the converter to operate in three states
    wherein in a first state of the three states, the first and third switches are conductive and the second and fourth switches are open;
    wherein in a second state of the three states, the first and fourth switches are conductive and the second and third switches are open; and wherein in a third state of the three states, the first and third switches are open and the second and fourth switches are conductive.

14. The method of claim 13, wherein the controller causes the converter to be in the first state for a time period equal to D2*T.

15. The method of claim 14, wherein the controller causes the converter to be in the first state and second states for a combined time period equal to D1*T.

16. A DC to AC converter, the converter comprising:
an input configured to receive a DC input voltage;
an output;
two serially connected capacitors connected across the output, the two serially connected capacitors including a first capacitor and a second capacitor connected together at a connection node;
a first parallel converter connected between the input and the connection node;
a second parallel converter connected between the input and the connection node and in parallel with the first parallel converter; and
a controller that selectively connects the first and second parallel converters to the input based on a first duty cycle (D1) and second duty cycle (D2), respectively, and wherein D2 is a fixed value and D1 is variable value, wherein D1 varies based on a desired alternating current signal across the output;
wherein the first parallel converter includes a first switch and first inductor connected in series between the input and the connection node; wherein the second parallel converter includes a third switch and second inductor connected in series between the input and the connection node;
the converter further comprising:
a second switch connected between an output of the first switch and first output terminal of the output; and
a fourth switch connected between an output of the third switch and a second output terminal of the output;
wherein when D2 is greater than D1, the controller causes the converter to operate in three states;
wherein in a first state of the three states, the first and third switches are conductive and the second and fourth switches are open;
wherein in a second state of the three states, the first and fourth switches are open and the second and third switches are conductive; and wherein in a third state of the three states, the first and third switches are open and the second and fourth switches are conductive.

17. A DC to AC converter, the converter comprising:
an input configured to receive a DC input voltage;
an output;
two serially connected capacitors connected across the output, the two serially connected capacitors including a first capacitor and a second capacitor connected together at a connection node;
a first parallel converter connected between the input and the connection node;
a second parallel converter connected between the input and the connection node and in parallel with the first parallel converter; and
a controller that selectively connects the first and second parallel converters to the input based on a first duty cycle (D1) and second duty cycle (D2), respectively, and wherein D2 is a fixed value and D1 is variable value, wherein D1 varies based on a desired alternating current signal across the output;
wherein the first parallel converter includes a first switch and first inductor connected in series between the input and the connection node; wherein the second parallel converter includes a third switch and second inductor connected in series between the input and the connection node;
the converter further comprising:
a second switch connected between an output of the first switch and first output terminal of the output; and
a fourth switch connected between an output of the third switch and a second output terminal of the output;
wherein when D1 is greater than D2, the controller causes the converter to operate in three states;
wherein in a first state of the three states, the first and third switches are conductive and the second and fourth switches are open;
wherein in a second state of the three states, the first and fourth switches are conductive and the second and third switches are open; and
wherein in a third state of the three states, the first and third switches are open and the second and fourth switches are conductive.

* * * * *